US009898669B2

(12) United States Patent
Nishijima (10) Patent No.: US 9,898,669 B2
(45) Date of Patent: Feb. 20, 2018

(54) TRAVELING ROAD SURFACE DETECTION DEVICE AND TRAVELING ROAD SURFACE DETECTION METHOD

(71) Applicant: TOYOTA JIDOSHA KABUSHIKI KAISHA, Toyota-shi, Aichi (JP)

(72) Inventor: Masakazu Nishijima, Ebina (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 170 days.

(21) Appl. No.: 15/075,576

(22) Filed: Mar. 21, 2016

(65) Prior Publication Data

US 2016/0307051 A1 Oct. 20, 2016

(30) Foreign Application Priority Data

Apr. 17, 2015 (JP) ................................. 2015-084915

(51) Int. Cl.
*H04N 7/18* (2006.01)
*G06K 9/00* (2006.01)
(Continued)

(52) U.S. Cl.
CPC .......... *G06K 9/00798* (2013.01); *B60R 11/04* (2013.01); *G06K 9/00805* (2013.01);
(Continued)

(58) Field of Classification Search
CPC ................................................ G06K 9/00798
(Continued)

(56) References Cited

U.S. PATENT DOCUMENTS

2006/0193511 A1* 8/2006 Kimura .............. G06K 9/00805
382/154
2009/0190827 A1* 7/2009 Saito .................. G06K 9/00805
382/154

(Continued)

FOREIGN PATENT DOCUMENTS

| JP | 2006-236104 A | 9/2006 |
| WO | 2010/032523 A1 | 3/2010 |
| WO | 2015/053100 A1 | 4/2015 |

OTHER PUBLICATIONS

Labayrade, Raphael et al., "Real Time Obstacle Detection in Stereovision on Non Flat Road Geometry Through "V-disparity" Representation", IEEE, Jun. 17, 2002, XP010635896, pp. 646-651.

*Primary Examiner* — Leron Beck
(74) *Attorney, Agent, or Firm* — Sughrue Mion, PLLC (57) ABSTRACT

A traveling road surface detection device is provided. The traveling road surface device determines a road surface area, a stereoscopic object existence area where a stereoscopic object exists, and an indeterminate area other than the road surface area and the stereoscopic object existence area based on a parallax image of the surroundings of the vehicle, detects a traveling road surface that sequentially extends in a direction away from the vehicle based on the captured image, estimates a height position of a road surface within the road surface area based on the parallax information, and specifies an area including a parallax point with a height equal to or greater than a predetermined threshold value from the height position of the road surface in the indeterminate area as a parallax height existence area based on the estimated height position of the road surface and the parallax information.

12 Claims, 6 Drawing Sheets

(51) Int. Cl.
*B60R 11/04* (2006.01)
*G06T 7/70* (2017.01)
(52) U.S. Cl.
CPC ............ *G06T 7/70* (2017.01); *G06T 2200/04* (2013.01); *G06T 2207/30252* (2013.01)
(58) Field of Classification Search
USPC ........................................................ 348/148
See application file for complete search history.

(56) References Cited

U.S. PATENT DOCUMENTS

| | | |
|---|---|---|
| 2011/0063097 A1 | 3/2011 | Naka et al. |
| 2012/0269391 A1* | 10/2012 | Saito ..................... G08G 1/165 382/103 |
| 2014/0071240 A1 | 3/2014 | Chen et al. |
| 2016/0019429 A1* | 1/2016 | Ishigaki .................... G06T 7/73 348/47 |
| 2016/0253575 A1 | 9/2016 | Kakegawa et al. |

* cited by examiner

TRAVELING ROAD SURFACE DETECTION DEVICE AND TRAVELING ROAD SURFACE DETECTION METHOD

CROSS REFERENCE TO RELATED APPLICATION

This application claims priority from Japanese Patent Application No. 2015-084915 filed on Apr. 17, 2015, the disclosure of which is incorporated herein by reference in its entirety.

BACKGROUND

1. Field

Apparatuses and methods consistent with exemplary embodiments relate to a traveling road surface detection device and a traveling road surface detection method which detect a traveling road surface of a vehicle.

2. Related Art

A traveling road surface detection device detects a traveling road surface, on which a vehicle travels, and a stereoscopic object existence area where a stereoscopic object exists from parallax information of captured images of the surroundings of the vehicle. In addition, the traveling road surface detection device detects an area in front of the stereoscopic object existence area when viewed from the vehicle as a traveling area. An example of a traveling road surface detection device is described in U.S. Patent Application Publication No. 2014/0071240.

For detecting a stereoscopic object based on parallax information, for example, if the stereoscopic object is thin, the accuracy with which the traveling road surface detection device detects the stereoscopic object diminishes. In this case, even though the stereoscopic object exists, the traveling road surface detection device may detect, as a traveling road surface, an area where the stereoscopic object exists and an area ahead of the area where the stereoscopic object exists.

Accordingly, there is a need to provide a traveling road surface detection device and a traveling road surface detection method capable of detecting a traveling road surface with better accuracy.

SUMMARY

According to an aspect of an exemplary embodiment, a traveling road surface detection device for detecting a traveling road surface of a vehicle includes a parallax image generation unit configured to generate a parallax image including a parallax point as a pixel associated with parallax information based on a captured image of the surroundings of the vehicle captured by an in-vehicle camera, an area specification unit configured to specify a road surface area in the surroundings of the vehicle, a stereoscopic object existence area where a stereoscopic object exists, and an indeterminate area other than the road surface area and the stereoscopic object existence area in the surroundings of the vehicle based on the parallax image, a traveling road surface detection unit configured to detect the traveling road surface so as to sequentially extend in a direction away from the vehicle on the captured image, a road surface height estimation unit configured to estimate a height position of a road surface within the road surface area based on the parallax information, and a parallax height specification unit configured to specify an area including a parallax point with a height equal to or greater than a threshold value determined in advance from the height position of the road surface in the indeterminate area as a parallax height existence area based on the estimated height position of the road surface and the parallax information. The traveling road surface detection unit excludes, as the traveling road surface, the stereoscopic object existence area, the parallax height existence area, and an area on the side further away from the vehicle than the stereoscopic object existence area and the parallax height existence area when viewed from the vehicle.

In the traveling road surface detection device, the parallax height specification unit specifies the parallax height existence area including the parallax point with a height equal to or greater than the predetermined threshold value from the height position of the road surface in the indeterminate area based on the estimated height position of the road surface and the parallax information.

The traveling road surface detection unit excludes the stereoscopic object existence area, the parallax height existence area, and the area on the side further away from the vehicle than the stereoscopic object existence area and the parallax height existence area when viewed from the vehicle as the traveling road surface.

In this way, since the traveling road surface detection device does not detect or excludes the stereoscopic object existence area, the parallax height existence area, and the area on the side further away from the vehicle than the stereoscopic object existence area and the parallax height existence area when viewed from the vehicle as the traveling road surface, even when the stereoscopic object cannot be detected with excellent accuracy, it is possible to detect the traveling road surface with excellent accuracy while excluding an area out of the traveling road surface.

According to an aspect of an exemplary embodiment, a traveling road surface detection method for a traveling road surface detection device for detecting a traveling road surface of a vehicle includes a parallax image generation step of generating a parallax image including a parallax point as a pixel associated with parallax information based on a captured image of the surroundings of the vehicle captured by an in-vehicle camera by a parallax image generation unit of the traveling road surface detection device, an area specification step of specifying a road surface area in the surroundings of the vehicle, a stereoscopic object existence area where a stereoscopic object exists, and an indeterminate area other than the road surface area and the stereoscopic object existence area in the surroundings of the vehicle based on the parallax image by an area specification unit of the traveling road surface detection device, a traveling road surface detection step of detecting the traveling road surface so as to sequentially extend in a direction away from the vehicle on the captured image by a traveling road surface detection unit of the traveling road surface detection device, a road surface height estimation step of estimating a height position of a road surface within the road surface area based on the parallax information by a road surface height estimation unit of the traveling road surface detection device, and a parallax height specification step of specifying an area including a parallax point with a height equal to or greater than a threshold value determined in advance from the height position of the road surface in the indeterminate area as a parallax height existence area based on the estimated height position of the road surface and the parallax information by a parallax height specification unit of the traveling road surface detection device.

In the traveling road surface detection step, the stereoscopic object existence area, the parallax height existence area, and an area on the side further away from the vehicle than the stereoscopic object existence area and the parallax height existence area when viewed from the vehicle are excluded from the traveling road surface.

In the parallax height specification step, the traveling road surface detection device specifies the parallax height existence area including the parallax point with a height equal to or greater than the predetermined threshold value from the height position of the road surface in the indeterminate area based on the estimated height position of the road surface and the parallax information.

In the traveling road surface detection step, the traveling road surface detection device does not detect or excludes the stereoscopic object existence area, the parallax height existence area, and the area on the side further away from the vehicle than the stereoscopic object existence area and the parallax height existence area when viewed from the vehicle as the traveling road surface.

In this way, according to the traveling road surface detection method, since the stereoscopic object existence area, the parallax height existence area, and the area on the side further away from the vehicle than the stereoscopic object existence area and the parallax height existence area when viewed from the vehicle are not detected as the traveling road surface, even when the stereoscopic object cannot be detected with excellent accuracy, it is possible to detect the traveling road surface with excellent accuracy while excluding an area out of the traveling road surface.

According to an aspect of another exemplary embodiment, a traveling road surface detection device is provided. The traveling road surface detection device includes: at least one memory; and at least one processor configured to read and execute the computer executable instructions, the computer executable instructions causing the at least one processor to perform: generating a parallax image including a parallax point associated with parallax information based on a captured image of the surroundings of the vehicle; determining a road surface area, a stereoscopic object existence area where a stereoscopic object exists, and an indeterminate area other than the road surface area and the stereoscopic object existence area based on the parallax image; detecting a traveling road surface that sequentially extends in a direction away from the vehicle based on the captured image; estimating a height position of a road surface within the road surface area based on the parallax information; and specifying an area including a parallax point with a height equal to or greater than a predetermined threshold value from the height position of the road surface in the indeterminate area as a parallax height existence area based on the estimated height position of the road surface and the parallax information. The detecting a traveling road surface excludes the stereoscopic object existence area, the parallax height existence area, and an area on a side further away from the vehicle than the stereoscopic object existence area and the parallax height existence area when viewed from the vehicle as the traveling road surface.

The determining the road surface area may include setting a parallax vote map by arranging a plurality of rectangular blocks determined such that a side of the parallax vote map in a transverse direction corresponds to a position of the parallax image in a transverse direction and a side of the parallax vote map in a longitudinal direction corresponds to a magnitude of parallax.

The determining the road surface area may include calculating at least one from among an average value of parallax, a deviation of parallax, an average value of coordinates of the parallax image in the longitudinal direction at the parallax point, and a deviation of the coordinates of the parallax image in the longitudinal direction at the parallax point for each block of the plurality of rectangular blocks in the parallax vote map.

The detecting the traveling road surface may include setting a plurality of radiation lines so as to spread at a predetermined angle from the vehicle around the vehicle on the captured image.

According to various aspects of exemplary embodiments, it is possible to detect a traveling road surface with excellent accuracy.

DETAILED DESCRIPTION

Hereinafter, exemplary embodiments will be described with reference to the drawings. In the description of the drawings, the same elements are represented by the same reference numerals, and redundant descriptions will be omitted.

Figure 1:
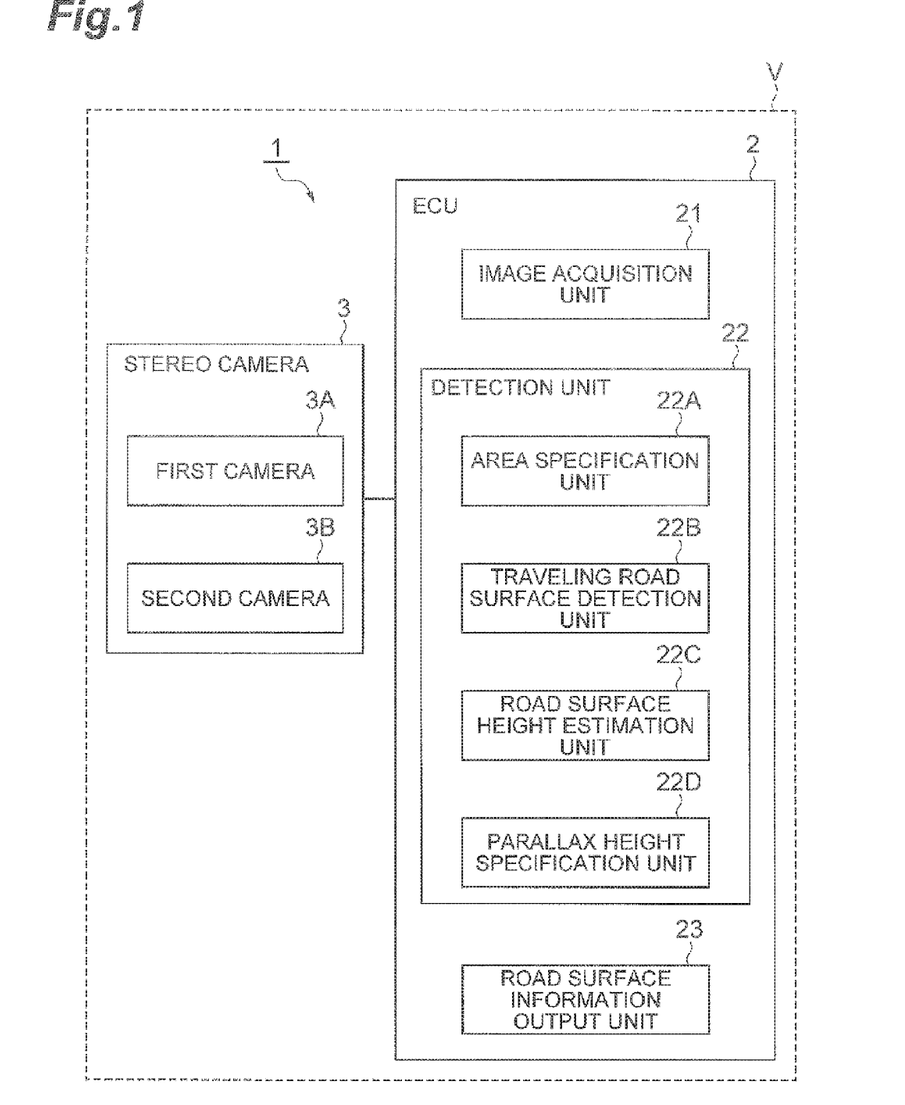
FIG. 1 is a diagram showing the schematic configuration of a traveling road surface detection device.

As shown in FIG. 1, a traveling road surface detection device 1 according to an exemplary embodiment is mounted in, for example, a vehicle V, such as a passenger vehicle, and detects a traveling road surface based on parallax information (information of a distance from an in-vehicle camera) obtained from a captured image of the surroundings of the vehicle V. The traveling road surface is, for example, a road surface of a road on which the vehicle V can travel. The traveling road surface may include a road surface of a passage in a parking lot or a parking space, in addition to the road surface of the road on which the vehicle V travels.

The traveling road surface detection device 1 acquires a captured image by using an in-vehicle camera which images the surroundings of the vehicle V and detects the traveling road surface based on parallax information (parallax) of a parallax image generated from the captured image. The parallax image is an image including parallax information.

As shown in FIG. 1, the traveling road surface detection device 1 includes an electronic control unit (ECU) 2 for detecting the traveling road surface, and a stereo camera (in-vehicle camera) 3. The ECU 2 is an electronic control unit having a central processing unit (CPU), a read only memory (ROM), a random access memory (RAM), and the like. The ECU 2 loads a program stored in the ROM into the RAM and execute the program on the CPU, thereby executing various kinds of processing. The ECU 2 may comprise a plurality of electronic control units.

The stereo camera 3 is an image acquisition apparatus which images the surroundings of the vehicle V to acquire a captured image. The stereo camera 3 has a first camera 3A and a second camera 3B arranged so as to reproduce binocular parallax. The first camera 3A and the second camera 3B are provided on, for example, the rear side of a windshield of the vehicle V and image in front of the vehicle V.

The traveling road surface detection device 1 may include a monocular camera, instead of the stereo camera 3. In the monocular camera, it is also possible to obtain a parallax image from a captured image (for example, by using a method that uses a time difference at the time of imaging).

Next, the functional configuration of the ECU 2 will be described. As shown in FIG. 1, the ECU 2 has an image acquisition unit (parallax image generation unit) 21, a detection unit 22, and a road surface information output unit 23.

The image acquisition unit 21 acquires a captured image captured by the stereo camera 3. The image acquisition unit 21 generates a parallax image including parallax information by based on, for example, a captured image of the first camera 3A and a captured image of the second camera 3B in the stereo camera 3. For example, parallax information is associated with each pixel constituting the parallax image. Hereinafter, a pixel in the parallax image associated with the parallax information is referred to as a parallax point.

The detection unit 22 detects a traveling road surface in the captured image of the stereo camera 3 based on the parallax information. For example, the detection unit 22 can use either of the captured images captured by the first camera 3A or the second camera 3B as the captured image of the stereo camera 3. In more detail, the detection unit 22 has an area specification unit 22A, a traveling road surface detection unit 22B, a road surface height estimation unit 22C, and a parallax height specification unit 22D. The units of the ECU may comprise circuity configured to perform the respective functions of the units, one or more processors configured to perform the respective functions units, etc.

The area specification unit 22A specifies a road surface area, a stereoscopic object existence area, and an indeterminate area based on the parallax information of the parallax image generated by the image acquisition unit 21. The road surface area is an area of a road surface in the surroundings of the vehicle V. The stereoscopic object existence area is an area where a stereoscopic object exists in the surroundings of the vehicle V. The indeterminate area is an area other than the road surface area and the stereoscopic object existence area in the surroundings of the vehicle V.

Figure 2:
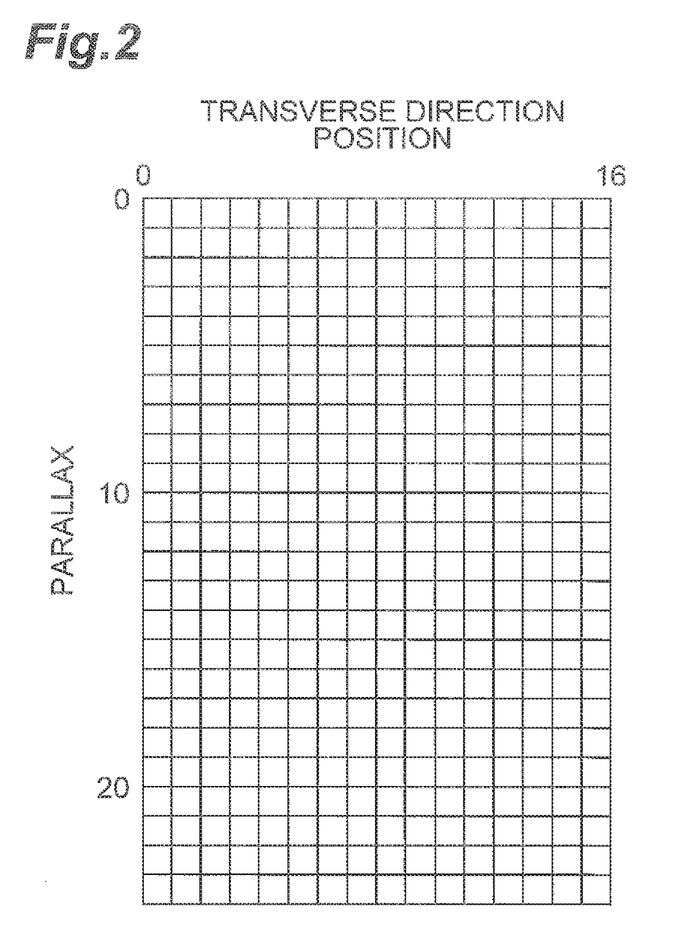
FIG. 2 is a diagram showing a parallax vote map in which the horizontal axis represents a transverse direction position in a parallax image and the vertical axis represents parallax.

As an example, the area specification unit 22A may specify the road surface area, the stereoscopic object existence area, and the indeterminate area as follows. First, the area specification unit 22A sets a parallax vote map shown in FIG. 2. The parallax vote map of FIG. 2 is set by arranging a plurality of rectangular blocks determined such that a side of the parallax vote map in a transverse direction corresponds to the position of the parallax image in a transverse direction (horizontal direction) and a side of the parallax vote map in a longitudinal direction corresponds to the magnitude of parallax. The area specification unit 22A classifies (votes) the parallax point into a corresponding block among a plurality of blocks constituting the parallax vote map based on the position of the parallax point and the magnitude of parallax of the parallax point in the parallax image. In this way, the area specification unit 22A associates the block of the parallax vote map with the parallax point.

Next, the area specification unit 22A calculates an average value of parallax, a deviation of parallax, an average value of the coordinates of the parallax image in the longitudinal direction at the parallax point, and a deviation of the coordinates of the parallax image in the longitudinal direction at the parallax point for each block of the parallax vote map.

For each block of the parallax vote map, the area specification unit 22A sets the attribute for a stereoscopic object to a block where the distribution of the parallax points in the longitudinal direction is great and the distribution in a parallax direction is small. Specifically, for example, the area specification unit 22A determines whether or not the distribution of the parallax points in the longitudinal direction (the deviation of the coordinates of the parallax image in the longitudinal direction at the parallax point) is less than a first threshold value set in advance. Furthermore, for example, the area specification unit 22A determines whether or not the distribution in the parallax direction (the deviation of the coordinates of the parallax image in the longitudinal direction at the parallax point/the deviation of parallax) is equal to or greater than a second threshold value. When the distribution of the parallax points in the longitudinal direction is equal to or greater than the first threshold value set in advance and the distribution in the parallax direction is less than the second threshold value, the area specification unit 22A sets the attribute for a stereoscopic object to the block. That is, within a block where the attribute for a stereoscopic object is set, a stereoscopic object with a height equal to or greater than the first threshold value exists. The area specification unit 22A specifies a parallax point classified into a block where the attribute for a stereoscopic object is set as a stereoscopic object candidate point.

Figure 3A:
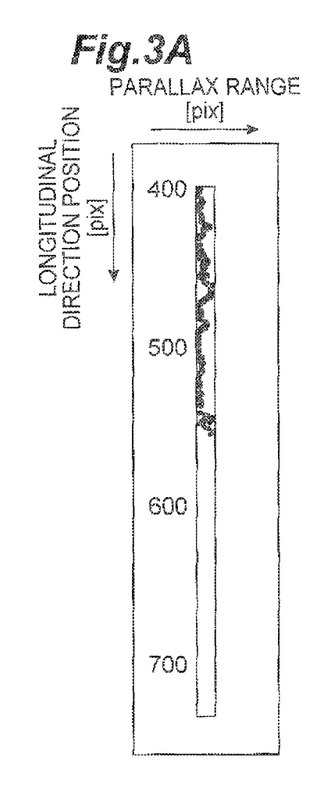
FIG. 3A is a diagram showing parallax points classified into a block where the attribute for a stereoscopic object is set.

For example, as shown in FIG. 3A, within a block of the parallax vote map, when parallax points having the same degree of parallax (distance) are distributed in a wide range of the positions in the longitudinal direction in the parallax image, the area specification unit 22A can determine that a set of the parallax points indicates a stereoscopic object.

For each block of the parallax vote map, the area specification unit 22A sets the attribute for a road surface to a block where the distribution of the parallax points in the longitudinal direction is small and the distribution in the parallax direction is great. Specifically, for example, the area specification unit 22A determines whether or not the distribution of the parallax points in the longitudinal direction (the deviation of the coordinates of the parallax image in the longitudinal direction at the parallax point) is less than a third threshold value set in advance. Furthermore, for example, the area specification unit 22A determines whether or not the distribution in the parallax direction (the deviation of the coordinates of the parallax image in the longitudinal direction at the parallax point/the deviation of parallax) is equal to or greater than a fourth threshold value. When the distribution of the parallax points in the longitudinal direction is less than the third threshold value set in advance and the distribution in the parallax direction is equal to or greater than the fourth threshold value, the area specification unit 22A sets the attribute for a road surface to the block. The area specification unit 22A specifies a parallax point classified into the block where the attribute for a road surface is set as a road surface candidate point.

Figure 3B:
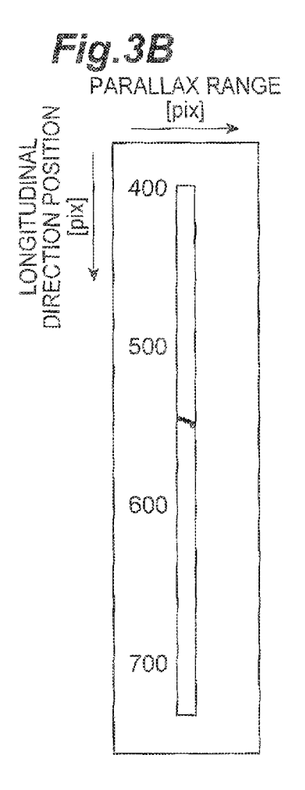
FIG. 3B is a diagram showing parallax points classified into a block where the attribute for a road surface is set.

For example, as shown in FIG. 3B, when the parallax points having the same degree of parallax (distance) are distributed in a narrow range of the positions in the longitudinal direction in the parallax image within the block of the parallax vote map, and the positions in the longitudinal direction in the parallax image moves upward with a decrease in parallax (with an increase in the distance), the area specification unit 22A can determine that a set of the parallax points indicates a road surface.

The area specification unit 22A sets the attribute of indetermination to a block where any of the attribute for a road surface and the attribute for a stereoscopic object is not set among the blocks of the parallax vote map. The area specification unit 22A specifies the parallax points classified into a block where a stereoscopic object or a road surface is not specified and the attribute for indetermination as an indetermination candidate point. The block where the attribute for indetermination is set may be a block where an object with such a height that the attribute for a stereoscopic object is set, an object with a thin horizontal width, or the like is included. The block where the attribute for indetermination is set may be a block where the attribute for indetermination is set since the number of classified (voted) parallax points is less than a reference number set in advance. The block where the attribute for indetermination is set may be a block where the existence of a stereoscopic object is unknown.

Figure 3C:
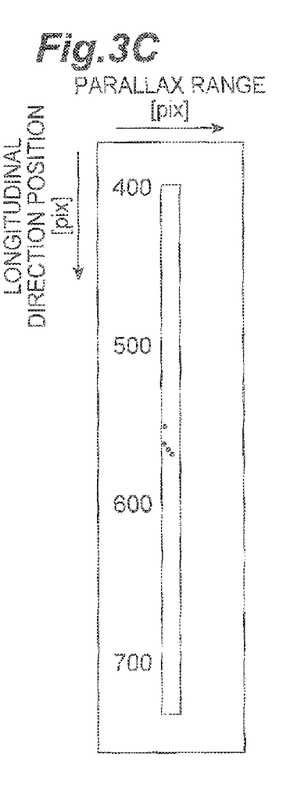
FIG. 3C is a diagram showing parallax points classified into a block where the attribute for indetermination is set.
Figure 3D:
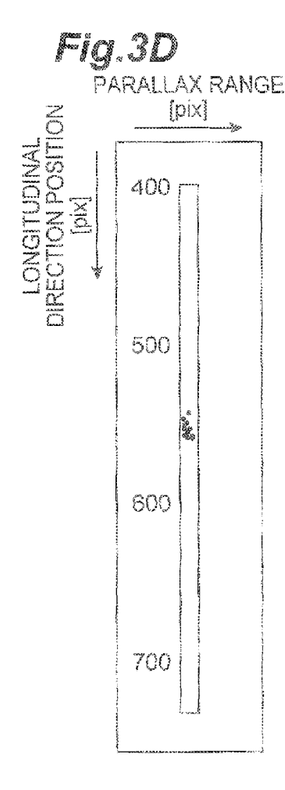
FIG. 3D is a diagram showing parallax points classified into a block where the attribute for the existence of a parallax height is set.

Specifically, for example, as shown in FIG. 3C, the block where the attribute for indetermination is set may include a block where an object represented by a set of parallax points cannot be determined since the number of parallax points within the block is small. Furthermore, for example, as shown in FIG. 3D, the block where the attribute for indetermination is set may include a block where the parallax points having the same degree of parallax (distance) are distributed in a narrow range of the positions in the longitudinal direction in the parallax image. The block where the parallax points having the same degree of parallax (distance) are distributed in a narrow range in the longitudinal direction in the parallax image may be a block where a stereoscopic object with a low height is included.

Figure 4:
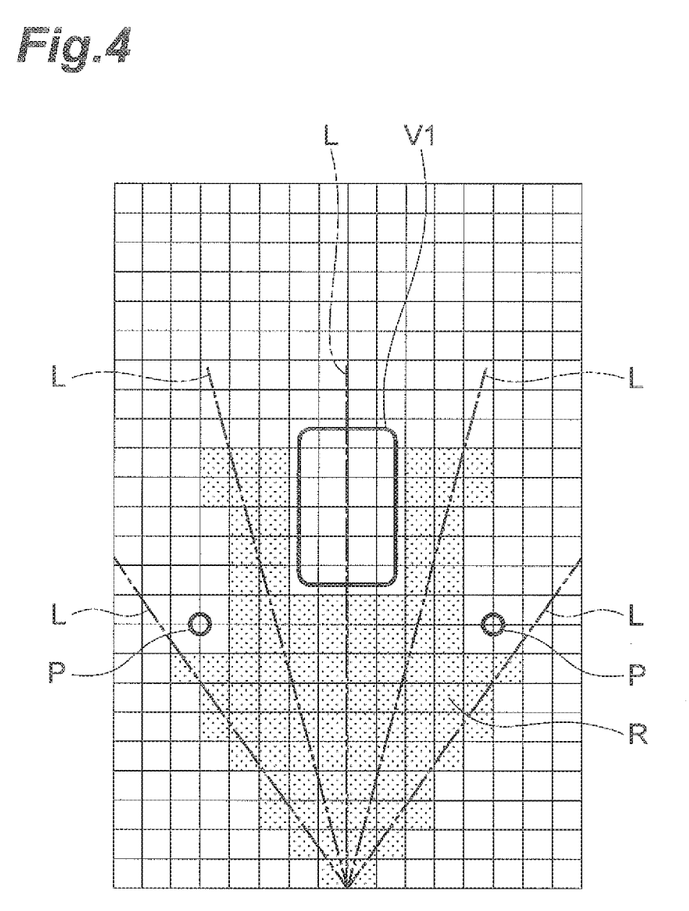
FIG. 4 is a diagram showing a state of detecting a traveling road surface along a radiation line set on a captured image.

The area specification unit 22A sets a grid in the captured image of the stereo camera 3 at an interval determined in advance (see FIG. 4). The area specification unit 22A makes a parallax point correspond to the captured image and specifies a grid square where a stereoscopic object candidate point exists in among the grid squares as a stereoscopic object existence area. The area specification unit 22A specifies an area where only a road surface candidate point exists among the grid squares as a road surface area. The area specification unit 22A specifies a grid square where an indetermination candidate point exists among the grid squares as an indeterminate area.

The road surface height estimation unit 22C estimates the height position of the road surface in the surroundings of the vehicle V based on the parallax information. Specifically, first, the road surface height estimation unit 22C estimates the height position of the road surface based on the road surface candidate point in the grid square specified as the road surface area by the area specification unit 22A. The road surface height estimation unit 22C can perform the estimation of the height position of the road surface based on the road surface candidate point using, for example, a V-disparity image.

The parallax height specification unit 22D specifies a parallax height existence area among the grid squares specified as the indeterminate area based on the estimated height position of the road surface and the parallax information. The parallax height existence area is an area including the parallax points with a height equal to or greater than a threshold value determined in advance from the height position of the road surface among the grid squares specified as the indeterminate area.

Specifically, first, the parallax height specification unit 22D uses the height position of the road surface estimated by the road surface height estimation unit 22C as a reference height position. The parallax height specification unit 22D calculates the height from the reference height position for a set of indetermination candidate points within each grid square. For example, the parallax height specification unit 22D calculates the height from the reference height position in the set of indetermination candidate points based on the reference height position and the distribution of the indetermination candidate points. That is, the parallax height specification unit 22D calculates the height from the reference height position in an object represented by the indetermination candidate points. The parallax height specification unit 22D determines whether or not the calculated height from the reference height position in the set of indetermination candidate points is equal to or greater than a threshold value determined in advance. When the calculated height from the reference height position in the set of indetermination candidate points is equal to or greater than the threshold value determined in advance, the parallax height specification unit 22D specifies a grid square including the set of indetermination candidate points as a parallax height existence area. That is, the parallax height specification unit 22D rewrites the attribute from indetermination to the existence of the parallax height for the grid square specified as the indeterminate area by the area specification unit 22A. For example, a grid square including a set of parallax points shown in FIG. 3D may be specified as a parallax height existence area.

In this way, the grid square specified as the parallax height existence area is a block which has not been specified as a stereoscopic object existence area by the area specification unit 22A since the height width of the set of parallax points is insufficient, but includes a set of parallax points with a certain height from the road surface without having such a height to be that specified as a stereoscopic object. That is, the grid square specified as the parallax height existence area is a grid square which is specified as not a traveling road surface since a set of parallax points with a certain height from the road surface is included.

The traveling road surface detection unit 22B detects the traveling road surface so as to sequentially extend in a direction away from the vehicle V on the captured image. In this exemplary embodiment, the traveling road surface detection unit 22B sequentially detects the traveling road surface so as to spread in a radiation direction from the vehicle V with respect to the grid set in the captured image. In this case, for example, the traveling road surface detection unit 22B sets a plurality of radiation lines L (see FIG. 4) so as to spread at an angle determined in advance from the vehicle V around the vehicle V on the captured image. For the grid squares through which the radiation line L passes, the traveling road surface detection unit 22B sequentially detects the traveling road surface from a side close to the vehicle V toward a distant side such that the area of the traveling road surface extends. When the grid square through which the radiation line L passes is the parallax height existence area or the stereoscopic object existence area, the traveling road surface detection unit 22B does not detect the parallax height existence area, the stereoscopic object existence area, and an area on the side further away from the vehicle V than the parallax height existence area and the stereoscopic object existence area when viewed from the vehicle V as the traveling road surface on the radiation line L.

Specifically, first, the traveling road surface detection unit 22B determines whether or not a grid square closest to the vehicle V among the grid squares through which the radiation line L passes is the parallax height existence area or the stereoscopic object existence area. When the grid square closest to the vehicle V is not the parallax height existence area or the stereoscopic object existence area, the traveling road surface detection unit 22B determines whether or not an area within the grid square is the traveling road surface based on at least one of the parallax point within the grid square and pixel information (luminance, texture, and the like). The traveling road surface detection unit 22B can use various methods, such as an image processing method, as a method of determining whether or not the area within the grid square is the traveling road surface based on at least one of the parallax point and the pixel information.

When it is determined that the area within the grid square is the traveling road surface, as described above, the traveling road surface detection unit 22B determines whether or not a grid square next closest to the vehicle V among the grid squares through which the radiation line L passes is the parallax height existence area or the stereoscopic object existence area. As described above, the traveling road surface detection unit 22B detects the traveling road surface based on at least one of the parallax point within the grid square and the pixel information.

In this way, the traveling road surface detection unit 22B sequentially detects the traveling road surface from a side close to the vehicle V among the grid squares, through which the radiation line L passes, so as to form the area of the traveling road surface. That is, the traveling road surface detection unit 22B detects an area up to a grid square right before the grid square as the parallax height existence area or the stereoscopic object existence area (a grid square next closest to the vehicle V) among the grid squares through which the radiation line L passes or an area up to a grid square right before the grid square determined to be not the traveling road surface based on at least one of the parallax point and the pixel information as the traveling road surface. The traveling road surface detection unit 22B sequentially detects the traveling road surface along the radiation line L for each radiation line L.

FIG. 4 shows an example of the detected traveling road surface. Note that FIG. 4 shows the captured image of the stereo camera 3 converted to a state of being viewed from above the vehicle V in order to make the range of the detected traveling road surface easily visible. In the example shown in FIG. 4, a preceding vehicle V1 is traveling in front of the vehicle V. It is assumed that a grid square where the preceding vehicle V1 exists is specified as a stereoscopic object existence area by the area specification unit 22A. Two poles P are provided in front of the vehicle V. It is assumed that a grid square where the pole P exists is specified as an indeterminate area by the area specification unit 22A, and is specified as a parallax height existence area by the parallax height specification unit 22D. For example, since the pole P is thin, it is assumed that a parallax point corresponding to the pole P is specified as an indetermination candidate point without being specified as a stereoscopic object candidate point. Furthermore, since the height of the pole P from the road surface is equal to or greater than a threshold value determined in advance, it is assumed that the parallax height specification unit 22D specifies a grid square including a set of parallax points (indetermination candidate points) corresponding to the pole P as a parallax height existence area. In FIG. 4, it is assumed that the vehicle V exists on the lower side in the drawing.

As described above, the traveling road surface detection unit 22B detects the traveling road surface from the side close to the vehicle V along the radiation line L. The traveling road surface detection unit 22B does not specify the grid square including the pole P specified as the parallax height existence area among the grid squares, through which the radiation line L passes, as a traveling road surface R. In FIG. 4, the traveling road surface R is an area with fine points. The traveling road surface detection unit 22B does not detect an area on a side further away from the vehicle V than the grid square including the pole P among the grid squares, through which the radiation line L passes, as the traveling road surface R. The traveling road surface detection unit 22B does not specify the grid square including the preceding vehicle V1 specified as the stereoscopic object existence area as the traveling road surface R. The traveling road surface detection unit 22B does not detect an area on a side further away from the vehicle V than the grid square including the preceding vehicle V1 among the grid squares, through which the radiation line L passes, as the traveling road surface R.

The road surface information output unit 23 outputs information of the traveling road surface R detected by the detection unit 22 to the outside. For example, the road surface information output unit 23 may output information of the traveling road surface R to an ECU which performs automatic driving of the vehicle V or an ECU which performs driving assistance of the vehicle V.

Figure 5:
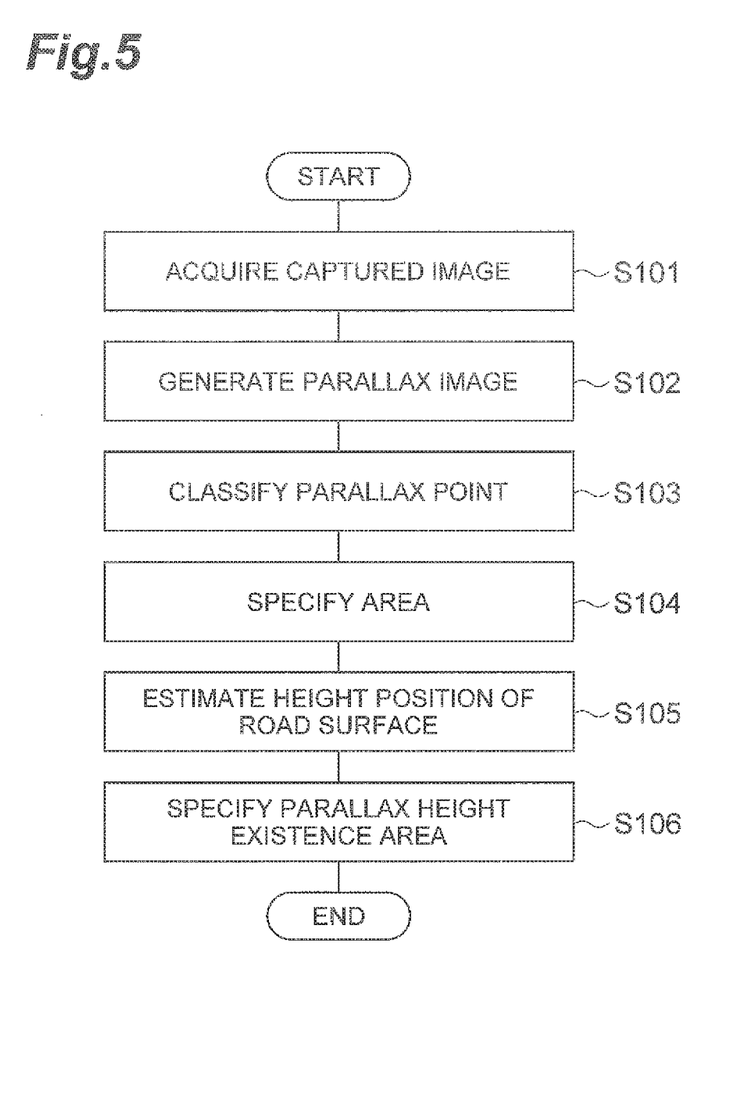
FIG. 5 is a flowchart showing the flow of processing for specifying a stereoscopic object existence area, a parallax height existence area.
Figure 6:
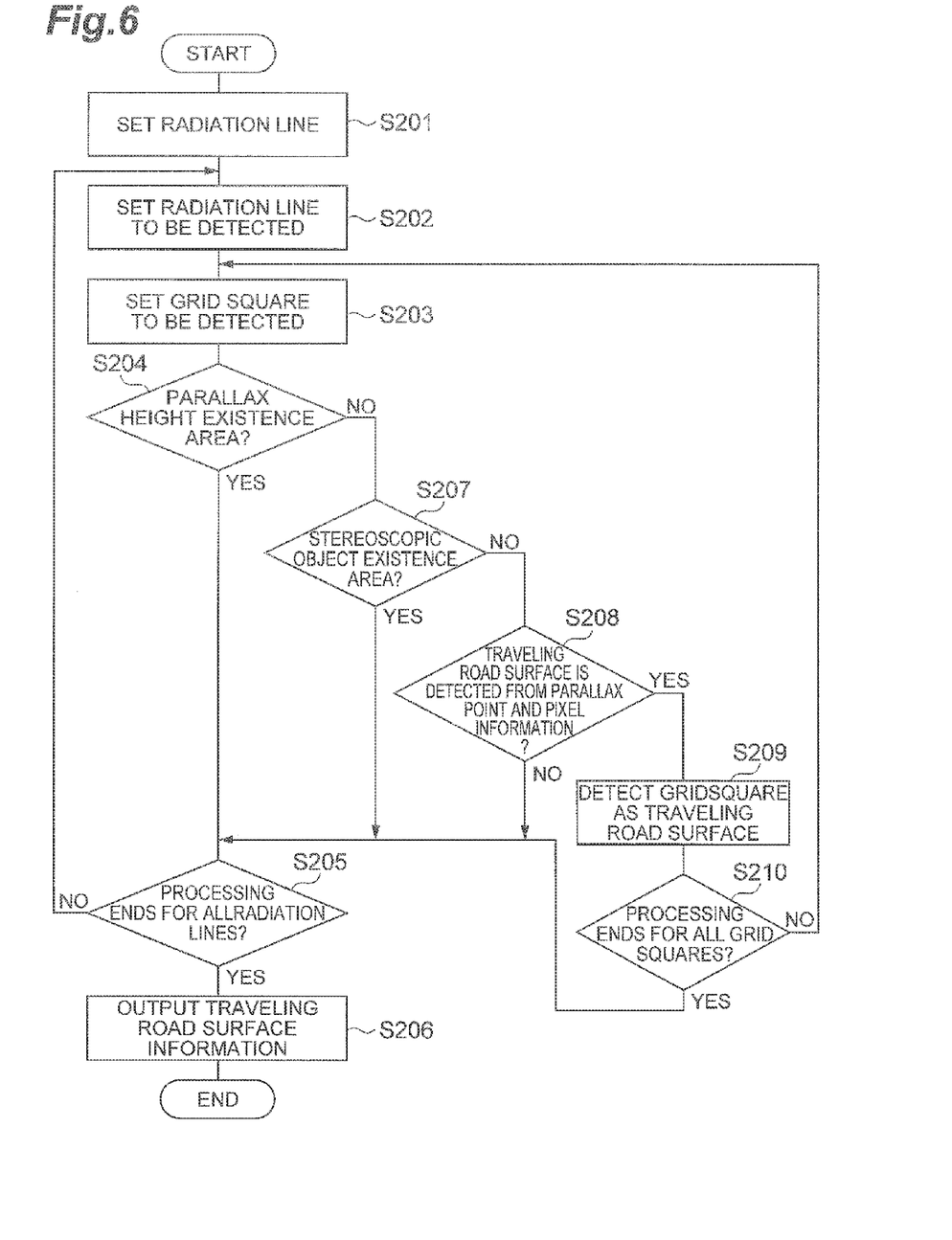
FIG. 6 is a flowchart showing the flow of processing for detecting a traveling road surface based on a specification result of a parallax height existence area.

Next, the flow of processing of a traveling road surface detection method which is performed by the traveling road surface detection device 1 will be described. Processing for detecting the traveling road surface R shown in FIGS. 5 and 6 is executed at every time set in advance, for example, while the vehicle V is being driven by an engine. First, the flow of processing for specifying a stereoscopic object existence area, a parallax height existence area, and the like from a captured image of the stereo camera 3 will be described referring to the flowchart of FIG. 5. The image acquisition unit 21 acquires a captured image captured by the stereo camera 3 (operation S101). The image acquisition unit 21 generates a parallax image based on the acquired captured image (operation S102: parallax image generation step). The area specification unit 22A classifies the parallax points in the parallax image into a stereoscopic object candidate point, a road surface candidate point, and an indetermination candidate point, for example, using a parallax vote map (operation S103).

The area specification unit 22A sets a grid square in the captured image of the stereo camera 3. The area specification unit 22A specifies a grid square where a stereoscopic object candidate point exists among the grid squares as a stereoscopic object existence area, specifies an area where only a road surface candidate point exists as a road surface area, and specifies a grid square where an indetermination candidate point exists as an indeterminate area (operation S104: area specification step).

The road surface height estimation unit 22C estimates the height position of the road surface based on the road surface candidate point within the grid square specified as the road surface area by the area specification unit 22A (operation S105: road surface estimation step). The parallax height specification unit 22D calculates the height from the reference height position for a set of indetermination candidate points within each grid square. When the calculated height from the reference height position in the set of indetermination candidate points is equal to or greater than a threshold value determined in advance, the parallax height specification unit 22D specifies the grid square including the set of indetermination candidate points as a parallax height existence area (operation S106: parallax height specification step).

Next, the flow of processing for detecting the traveling road surface R based on the specification result of the parallax height existence area and the like will be described referring to the flowchart of FIG. 6. The traveling road surface detection unit 22B sets a plurality of radiation lines L on the captured image of the stereo camera 3 (operation S201). The traveling road surface detection unit 22B sets the radiation line L to be a detection target of the traveling road surface R among a plurality of radiation lines L (operation S202). With the second or later time of execution of the processing of S202, the traveling road surface detection unit 22B sets the radiation line L, which is not set as a detection target, among a plurality of radiation lines L as the radiation line L of the detection target.

The traveling road surface detection unit 22B sets a grid square to be a detection target of the traveling road surface R (operation S203). The grid square is a grid square set on the captured image in S104. Specifically, the traveling road surface detection unit 22B sets a grid square closest to the vehicle V among the grid squares, through which the radiation line L to be a detection target set in S202 passes, as a grid square of a detection target. With the second or later time of execution of the processing of S203, the traveling road surface detection unit 22B sets a grid square away from the vehicle V next to the grid square set as a detection target for performing the processing of previous S203 as a detection target. In this way, the traveling road surface detection unit 22B sequentially sets a grid square to be a detection target in order from a side close to the vehicle V toward a distant side among the grid squares through which the radiation line L passes.

The traveling road surface detection unit 22B determines whether or not the grid square set as the detection target is a parallax height existence area (operation S204: traveling road surface detection step). When the grid square set as the detection target is the parallax height existence area (operation S204: YES), the traveling road surface detection unit 22B does not detect the grid square set as the detection target as the traveling road surface R. The traveling road surface detection unit 22B determines whether or not the detection processing of the traveling road surface R ends for all radiation lines L set in S201 (operation S205). When the detection processing of the traveling road surface R ends for all radiation lines L (operation S205: YES), the road surface information output unit 23 outputs information of the traveling road surface R detected by the traveling road surface detection unit 22B to the outside (operation S206). When the detection processing of the traveling road surface R does not end for all radiation lines L (operation S205: NO), the traveling road surface detection unit 22B returns to perform the processing of operation S202 described above.

When the grid square set as the detection target is not the parallax height existence area (operation S204: NO), the traveling road surface detection unit 22B determines whether or not the grid square set as the detection target is a stereoscopic object existence area (operation S207: traveling road surface detection step). When the grid square set as the detection target is the stereoscopic object existence area (operation S207: YES), the traveling road surface detection unit 22B does not detect the grid square set as the detection target as the traveling road surface R. The traveling road surface detection unit 22B returns to perform the processing of operation S205 described above.

When the grid square set as the detection target is not the stereoscopic object existence area (operation S207: NO), the traveling road surface detection unit 22B determines whether or not an area within the grid square set as the detection target is the traveling road surface R based on at least one of the parallax point within the grid square set as the detection target and the pixel information (S208). When the area within the grid square set as the detection target is not the traveling road surface R (operation S208: NO), the traveling road surface detection unit 22B does not detect the grid square set as the detection target as the traveling road surface R. The traveling road surface detection unit 22B performs the processing of S205 described above.

When the area within the grid square set as the detection target is the traveling road surface R (operation S208: YES), the traveling road surface detection unit 22B detects the grid square set as the detection target as the traveling road surface R (operation S209: traveling road surface detection step). Next, the traveling road surface detection unit 22B determines whether or not the detection processing of the traveling road surface R ends for all grid squares through which the radiation line L set in S202 passes through (operation S210). When the detection processing of the traveling road surface R ends for all grid squares (operation S210: YES), the traveling road surface detection unit 22B performs the processing of S205 described above. When the detection processing of the traveling road surface R does not end for all grid squares (operation S210: NO), the traveling road surface detection unit 22B performs the processing of S203 described above.

When the detection processing of the traveling road surface R ends for all grid squares, this may refer to a case where no further grid square is on the radiation line L. Furthermore, when the detection processing of the traveling road surface R ends for all grid squares, this may refer to a case where the detection processing of the traveling road surface R ends in a range set in advance from the vehicle V.

An exemplary embodiment configured as discussed above, and the parallax height specification unit 22D specify the area including a parallax point with a height equal to or greater than the threshold value determined in advance from the height position of the road surface in the indeterminate area as the parallax height existence area based on the height position of the road surface estimated by the road surface height estimation unit 22C and the parallax information. The traveling road surface detection unit 22B does not detect the stereoscopic object existence area, the parallax height existence area, and the area on the side further away from the vehicle V than the stereoscopic object existence area and the parallax height existence area when viewed from the vehicle V as the traveling road surface R. The parallax height existence area is an area which is not at least the traveling road surface R since a set of parallax points with a certain height from the road surface is included while a stereoscopic object has not been detected. In this way, the traveling road surface detection device 1 does not detect the stereoscopic object existence area, the parallax height existence area, and the area on the side further away from the vehicle V than the stereoscopic object existence area and the parallax height existence area when viewed from the vehicle V as the traveling road surface R. Therefore, even when it is not possible to detect a stereoscopic object with excellent accuracy, it is possible to detect the traveling road surface R with excellent accuracy while excluding an area which is not the traveling road surface.

Although exemplary embodiments have been described, the inventive concept is not limited to the foregoing exemplary embodiments. For example, although the traveling road surface detection unit 22B detects the traveling road surface R along the radiation line L spreading at an angle determined in advance from the vehicle V, the traveling road surface R may be detected along a reference line other than the radiation line L. For example, the traveling road surface detection unit 22B sets a plurality of reference lines parallel to the traveling direction of the vehicle V at predetermined intervals in a vehicle width direction on the captured image of the stereo camera 3. The traveling road surface detection unit 22B may sequentially detect the traveling road surface R from the front side of the vehicle V along the set reference line.

What is claimed is:

1. A traveling road surface detection device for detecting a traveling road surface of a vehicle, the traveling road surface detection device comprising:
   a parallax image generation unit configured to generate a parallax image including a parallax point associated with parallax information based on a captured image of the surroundings of the vehicle;
   an area specification unit configured to specify a road surface area, a stereoscopic object existence area where a stereoscopic object exists, and an indeterminate area other than the road surface area and the stereoscopic object existence area based on the parallax image;
   a traveling road surface detection unit configured to detect the traveling road surface that sequentially extends in a direction away from the vehicle based on the captured image;
   a road surface height estimation unit configured to estimate a height position of a road surface within the road surface area based on the parallax information; and
   a parallax height specification unit configured to specify an area including a parallax point with a height equal to or greater than a predetermined threshold value from the height position of the road surface in the indeterminate area as a parallax height existence area based on the estimated height position of the road surface and the parallax information,
   wherein the traveling road surface detection unit excludes the stereoscopic object existence area, the parallax height existence area, and an area on a side further away from the vehicle than the stereoscopic object existence area and the parallax height existence area when viewed from the vehicle as the traveling road surface.

2. A traveling road surface detection method for a traveling road surface detection device for detecting a traveling road surface of a vehicle, the traveling road surface detection method comprising:
   generating a parallax image including a parallax point associated with parallax information based on a captured image of the surroundings of the vehicle;
   specifying a road surface area, a stereoscopic object existence area where a stereoscopic object exists, and an indeterminate area other than the road surface area and the stereoscopic object existence area based on the parallax image;
   detecting the traveling road surface that sequentially extends in a direction away from the vehicle based on the captured image;
   estimating a height position of a road surface within the road surface area based on the parallax information; and
   specifying an area including a parallax point with a height equal to or greater than a predetermined threshold value from the height position of the road surface in the indeterminate area as a parallax height existence area based on the estimated height position of the road surface and the parallax information by a parallax height specification unit of the traveling road surface detection device,
   wherein, in the detecting the traveling road surface, the stereoscopic object existence area, the parallax height existence area, and an area on a side further away from the vehicle than the stereoscopic object existence area and the parallax height existence area when viewed from the vehicle are excluded from the traveling road surface.

3. A traveling road surface detection device, the traveling road surface detection device comprising:
   at least one memory comprising computer executable instructions; and
   at least one processor configured to read and execute the computer executable instructions, the computer executable instructions causing the at least one processor to perform:
   generating a parallax image including a parallax point associated with parallax information based on a captured image of the surroundings of the vehicle;
   determining a road surface area, a stereoscopic object existence area where a stereoscopic object exists, and an indeterminate area other than the road surface area and the stereoscopic object existence area based on the parallax image;
   detecting a traveling road surface that sequentially extends in a direction away from the vehicle based on the captured image;
   estimating a height position of a road surface within the road surface area based on the parallax information; and
   specifying an area including a parallax point with a height equal to or greater than a predetermined threshold value from the height position of the road surface in the indeterminate area as a parallax height existence area based on the estimated height position of the road surface and the parallax information,
   wherein the detecting a traveling road surface excludes the stereoscopic object existence area, the parallax height existence area, and an area on a side further away from the vehicle than the stereoscopic object existence area and the parallax height existence area when viewed from the vehicle as the traveling road surface.

4. The traveling road surface detection device of claim 3, wherein the determining the road surface area comprises setting a parallax vote map by arranging a plurality of rectangular blocks determined such that a side of the parallax vote map in a transverse direction corresponds to a position of the parallax image in a transverse direction and a side of the parallax vote map in a longitudinal direction corresponds to a magnitude of parallax.

5. The traveling road surface detection device of claim 4, wherein the determining the road surface area comprises calculating at least one from among an average value of parallax, a deviation of parallax, an average value of coordinates of the parallax image in the longitudinal direction at the parallax point, and a deviation of the coordinates of the parallax image in the longitudinal direction at the parallax point for each block of the plurality of rectangular blocks in the parallax vote map.

6. The traveling road surface detection device of claim 3, wherein the detecting the traveling road surface comprises setting a plurality of radiation lines so as to spread at a predetermined angle from the vehicle around the vehicle on the captured image.

7. The traveling road surface detection device of claim 1, wherein the area specification unit is configured to set a parallax vote map by arranging a plurality of rectangular blocks determined such that a side of the parallax vote map in a transverse direction corresponds to a position of the parallax image in a transverse direction and a side of the parallax vote map in a longitudinal direction corresponds to a magnitude of parallax.

8. The traveling road surface detection device of claim 7, wherein the area specification unit is configured to calculate at least one from among an average value of parallax, a deviation of parallax, an average value of coordinates of the parallax image in the longitudinal direction at the parallax point, and a deviation of the coordinates of the parallax image in the longitudinal direction at the parallax point for each block of the plurality of rectangular blocks in the parallax vote map.

9. The traveling road surface detection device of claim 1, wherein the traveling road surface detection unit is configured to set a plurality of radiation lines so as to spread at a predetermined angle from the vehicle around the vehicle on the captured image.

10. The traveling road surface detection method of claim 2, wherein the specifying the road surface area comprises setting a parallax vote map by arranging a plurality of rectangular blocks determined such that a side of the parallax vote map in a transverse direction corresponds to a position of the parallax image in a transverse direction and a side of the parallax vote map in a longitudinal direction corresponds to a magnitude of parallax.

11. The traveling road surface detection method of claim 10, wherein the specifying the road surface area comprises calculating at least one from among an average value of parallax, a deviation of parallax, an average value of coordinates of the parallax image in the longitudinal direction at the parallax point, and a deviation of the coordinates of the parallax image in the longitudinal direction at the parallax point for each block of the plurality of rectangular blocks in the parallax vote map.

12. The traveling road surface detection method of claim 2, wherein the detecting the traveling road surface comprises setting a plurality of radiation lines so as to spread at a predetermined angle from the vehicle around the vehicle on the captured image.

* * * * *